US007933961B2

(12) United States Patent  (10) Patent No.: US 7,933,961 B2
Mandel et al.  (45) Date of Patent: Apr. 26, 2011

(54) EMAIL RATING SYSTEM AND METHOD (75) Inventors: Barry P. Mandel, Fairport, NY (US); Stephen P. Hoover, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 12/111,274

(22) Filed: Apr. 29, 2008

(65) Prior Publication Data

US 2009/0271373 A1 Oct. 29, 2009

(51) Int. Cl.
 *G06F 15/16* (2006.01)
(52) U.S. Cl. .................................. 709/206; 709/204
(58) Field of Classification Search .................. 709/204, 709/206
 See application file for complete search history.

(56) References Cited

U.S. PATENT DOCUMENTS

| | | | | |
|---|---|---|---|---|
| 7,287,060 | B1 * | 10/2007 | McCown et al. | 709/206 |
| 7,783,711 | B2 * | 8/2010 | LeVasseur et al. | 709/206 |
| 2002/0144149 | A1 * | 10/2002 | Hanna et al. | 713/201 |
| 2004/0177120 | A1 * | 9/2004 | Kirsch | 709/206 |
| 2005/0097321 | A1 * | 5/2005 | Zhu et al. | 713/166 |
| 2006/0047766 | A1 * | 3/2006 | Spadea | 709/206 |
| 2006/0277260 | A1 | 12/2006 | Hardy, Jr. | |
| 2007/0005717 | A1 * | 1/2007 | LeVasseur et al. | 709/206 |
| 2007/0005762 | A1 * | 1/2007 | Knox et al. | 709/224 |
| 2007/0106735 | A1 | 5/2007 | Hardy, Jr. | |
| 2007/0106736 | A1 | 5/2007 | Shepherd | |
| 2007/0113101 | A1 * | 5/2007 | LeVasseur et al. | 713/189 |
| 2007/0143411 | A1 | 6/2007 | Costea et al. | |
| 2007/0168430 | A1 | 7/2007 | Brun et al. | |
| 2008/0195717 | A1 * | 8/2008 | Brown | 709/207 |
| 2008/0250106 | A1 * | 10/2008 | Rugg et al. | 709/206 |
| 2009/0006202 | A1 * | 1/2009 | Alroy | 705/14 |
| 2009/0037469 | A1 * | 2/2009 | Kirsch | 707/104.1 |
| 2009/0037546 | A1 * | 2/2009 | Kirsch | 709/206 |

* cited by examiner

*Primary Examiner* — Mohamed Wasel
(74) *Attorney, Agent, or Firm* — Philip E. Blair; Fleit Gibbons Gutman Bongini & Bianco P.L.

(57) ABSTRACT

A novel email rating system for enabling a user to rate an email based on characteristics selectable from several categories. In one example embodiment, a sender's email is received by an email receiver. The sender of the email is identified. If the sender is a person whose emails are to be rated by the receiver, cumulative ratings and other information associated with the sender and the recipient are retrieved from a database over a network. The retrieved ratings for the sender are displayed to the receiver either on the email or in a pop-up window. Various other information and selectable options are also displayed for the receiver. After reading the email, the receiver can rate the email in any of a plurality of defined categories such as, for example, usefulness, educational, motivational, helpfulness, productivity, spelling/grammar.

14 Claims, 5 Drawing Sheets

EMAIL RATING SYSTEM AND METHOD

TECHNICAL FIELD

The present invention is directed to systems and methods for enabling an email receiver to view a sender's cumulative email rating and rate an email received from the sender according to any of a plurality of selectable characteristics.

BACKGROUND

E-mail, short for "electronic mail" and often abbreviated to email, is a store and forward method of composing, sending and receiving messages over an electronic messaging communication system. The term email applies to both an internet-based e-mail system utilizing Simple Mail Transfer Protocol (SMTP) protocols and an intranet-based e-mail system often within a single organizational structure utilizing X.400 protocols for internal e-mail service supporting workgroup collaboration. Email predates the inception of the internet.

MIT first demonstrated the Compatible Time Sharing System (CTSS) in 1961 which allowed multiple users to log into a computer (such as the IBM 7094) from designated remote terminals to store/retrieve files from a centralized data storage medium. Email messaging started around 1965 as a way for multiple users of a single time-sharing mainframe computer to communicate amongst themselves. Email messaging was extended to a networked computing environment to enable users to send/receive messages between different computer systems.

As the proliferation of emails occurred with the growth of the Internet, the number of unsolicited email messages grew as well. There are systems and methods known in the art for filtering emails containing spam, or explicit images, viruses, and the like. One method which filters emails using a spam detection server is disclosed in U.S. Pat. No. 7,287,060 entitled System and Method for Rating Unsolicited E-Mail.

Aside from spam detection system and methods known in the arts, email continues to proliferate as a well established means of written communication between diverse peoples. Millions of legitimate emails are sent and received each day for business and personal communication. Currently there are no methods for rating a sender's email based on the quality of the email itself, as determined by the receiver, as a means of providing feedback to the sender. For instance, if a user continually sends poorly written emails containing numerous spelling errors, they may not realize that their emails are being viewed unfavorably by receivers and thus, without feedback, may not learn to change the way they draft their emails. Such changes may be, for instance, learning to consistently run a spellcheck program on the text of their emails before sending the message. In another example, a sender might not normally provide adequate or sufficient information in their emails on the topic at hand and thus never realise, without feedback, that the receiver tends to view emails sent by that sender unfavorably. Perhaps the sender has a tendency to include irrelevant links which the email receiver doesn't find particularly useful or helpful, or when sending an email to one recipient, the sender may copy in a long list of others who did not really need to read/review a particular email. Without feedback from the email receiver, a sender may never realize that a particular receiver they send emails to tends to view emails from them unfavorably. Thus, the sender may never correct problems receivers are having with their emails without the issue being raised separately. Presently, the only method by which an email receiver can provide feedback to a sender regarding various characteristics of the email itself such as quality or usefulness or helpfulness, etc., is to draft a reply email and send that to the receiver either praising the email received for its content or explaining why such an email was not useful.

What is needed in this art is an email rating system wherein overall ratings given to email senders by various email receivers are stored globally and an overall rating score based on ratings given email senders can be readily determined. Mechanism are also needed by which email receivers can review historical rating scores given by other email receivers. This is especially important for intra-office email communications within a large corporation where the problem of sending or replying to email using large distribution lists can result in a large number of un-necessary emails being received by individuals within the corporation.

Accordingly, what is needed in this art is a sophisticated email rating system and methods which enables email receivers to rate a sender's email and enable the receiver to provide a rating to the sender as feedback.

BRIEF SUMMARY

What is provided are a novel system and method for an email rating system which enables a user to rate an email based on characteristics selectable from several categories. Cumulative global email rating scores for senders given by other receivers are stored in a centralized database accessible over a network. Local overall ratings given by a receiver are also stored. Such information is automatically retrieved, formatted, and displayed for the email receiver at the time the sender's email is opened. Various options are displayed which enable a receiver to rate a sender's email. Other features and enhancements are provided. Advantageously, the present email rating system and method can be readily implemented on a receiver's email client.

In one example embodiment, a sender's email is received by an email receiver. The sender of the email is identified. If the sender is a person whose emails are to be rated by the receiver, cumulative ratings and other information associated with the sender and the recipient are retrieved from a database over a network. The retrieved ratings for the sender are displayed to the receiver either on the email or in a pop-up window. Various other information and selectable options are also displayed for the receiver. After reading the email, the receiver can rate the email in any of a plurality of defined categories such as, for example, usefulness, educational, motivational, helpfulness, productivity, spelling/grammar. Additional categories by which a receiver can rate an email can be added or customized by the receiver. Alternatively, the receiver can elect not to rate the email. After the receiver rates the sender's email, the ratings given are sent to the centralized database for addition to the cumulative email ratings associated with the sender. If no email ratings for this sender exist in the database then a new record is added and stored. The rating given by the receiver is provided to the sender. The receiver can optionally elect to not send the rating to the sender. In this embodiment, the functionality of the present email rating system is provided by the receiver's email client.

Depending on the networked computing environment and the objectives of the end-users hereof, various portions of the present email rating system can be implemented on the mail server. In this embodiment, the mail server receives the sender's incoming email. Before the mail server forwards the sender's email to the receiver's email client, the mail server queries the centralized database for any stored ratings associated with the sender and receiver. Ratings and other information, if any, are then retrieved from the database and sent to the receiver along with the email. The receiver's email client receives the retrieved information and the email. Ratings associated with the sender and receiver are displayed for the receiver. A notification is optionally provided to the receiver that a received incoming email has rating data associated with it. The receiver selects among a plurality of categories by which to rate the sender. At the receiver's option the rating is provided to the sender as feedback.

Additional embodiments hereto include enabling a sender to request that a receiver rate or not rate a particular email or request that a receiver rate the sender's email according to a suggested criteria. Alternatively, the sender may forward a desired rating criteria with the email. The receiver may choose to ignore the sender's request or rate the sender's email according to another criteria.

Additional enhancements hereto include making email ratings stored on the centralized database viewable to the world utilizing specialized software tool downloadable over the internet and installable on the user's computer system. Once installed, the specialized software provides a plurality of menus and other options enabling users to interact with the centralized database and review their own personal email ratings received and/or review ratings given to senders by various receivers. Enhancements to the software tool would include providing users with the ability to notify or petition an email rating system administrator to make a correction to one or more email ratings stored in the database. Such a correction would be, for instance, if a user of the present email rating system believes that they have been wrongly or maliciously rated by a particular sender. The specialized software tool would also provide users with other features for viewing, correcting, and otherwise modifying, email ratings.

Advantageously, the present email rating system and historical database enables receivers to manage emails received from senders with overall low or poor email ratings. Senders with consistently low or poor email ratings would be handled or managed differently than would emails received from senders with high email rating scores. Emails received from senders with consistently low or poor email rating scores can be blocked, redirected, or managed appropriately.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for an email rating system which enables a user to rate an email based on characteristics selectable from several categories. Cumulative global email rating scores for senders given by other receivers are stored in a centralized database accessible over a network. Local overall ratings given by a receiver are also stored. Such information is automatically retrieved, formatted, and displayed for the email receiver at the time the sender's email is opened. Various options are displayed which enable a receiver to rate a sender's email. Other features and enhancements are provided.

It should be understood that one of ordinary skill in this art would be readily familiar with many facets of emails, email clients, mail servers, and other techniques common in the arts for facilitating email message communication. Such techniques would also include algorithms for storing and retrieving data from a database over a network and displaying retrieved information either in the email itself or in a pop-up window associated with the email for review by the receiver. Further, one skilled in this art would be able to construct pull-down menus with a plurality of options for a user to select. One of ordinary skill would also be knowledgeable about many facts of computer science and software and programming sufficient to implement the present email rating system in their own networked computing environments without undue experimentation.

Terms such as "email" and "e-mail" and "email message", as used herein, are intended to be broadly construed as encompassing any electronic mail messages. Terms such as mail transfer agent (MTA) (often referred to as a mail transport agent, message transfer agent, or smtpd (SMTP daemon)), is intended to mean a computer program or software agent capable of transferring electronic mail messages from one computer to another. The term "mail server", as used herein, is intended to mean a computer acting as an MTA running the appropriate software. The term "mail exchanger" (MX), as used herein in the context of the Domain Name System, refers to an IP address assigned to a device hosting a mail server, and by extension also refers to the server itself. An MTA receives mail from another MTA (relaying), from a mail user agent (MUA) acting as a mail submission agent (MSA), or from an MSA that received the mail from the MUA. The MTA works behind the scenes while the user usually interacts with the MUA. The delivery of e-mail to a user's inbox typically takes place via a mail delivery agent (MDA). Many MTAs contain basic MDA functionality but a dedicated MDA often provides more sophistication.

Figure 1:
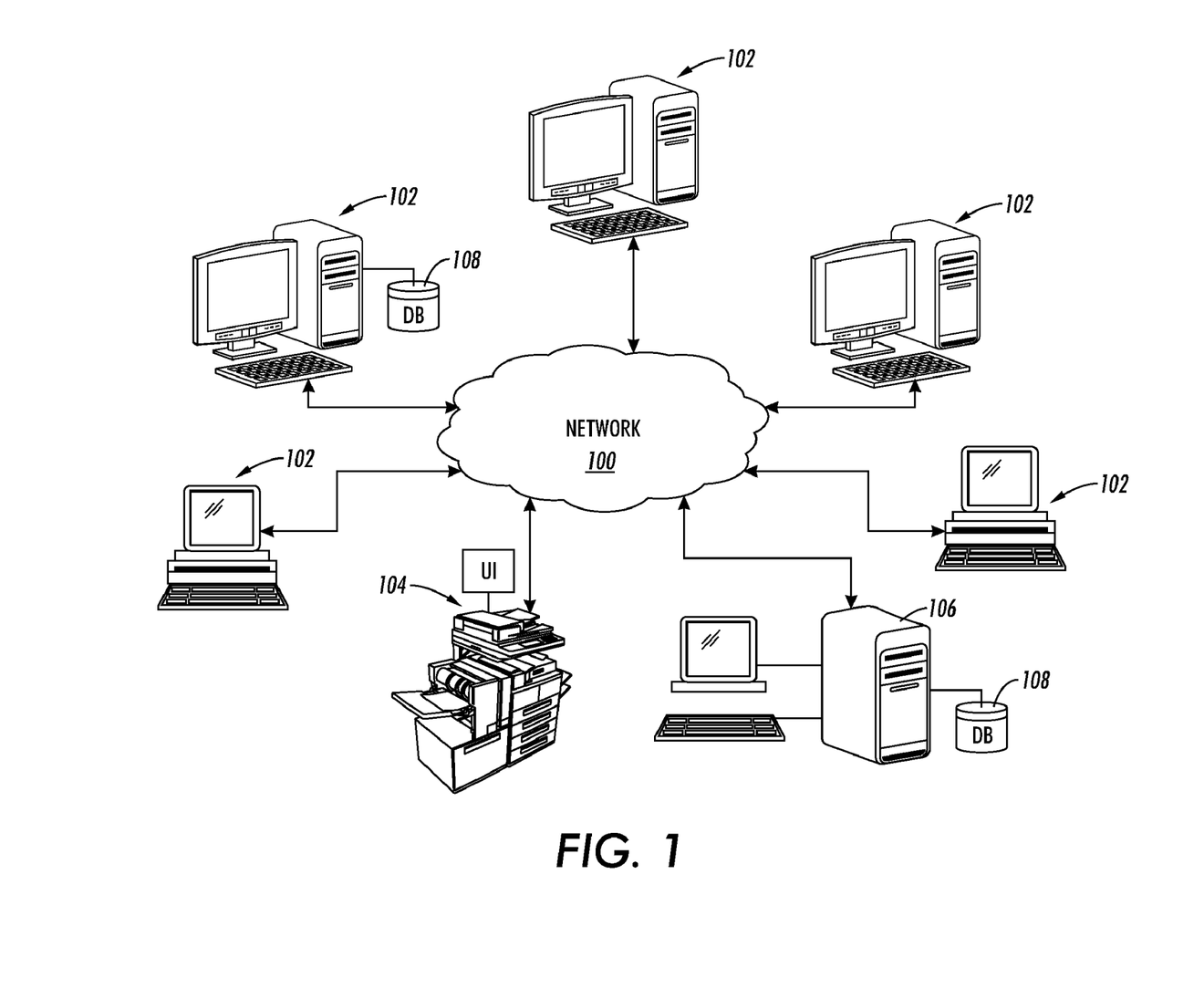
FIG. 1 illustrates one example of a networked computing environment wherein various features of the present email rating system and method will likely find their intended uses.

Reference is now being made to FIG. 1 which is one example of a networked computing environment wherein various features of the present email rating system and method will likely find their intended uses. The following is intended to provide a general description of a suitable computing environment in which the present method and system may be implemented. It should be understood that other computing environments are equally capable of providing various features of the present email rating system.

In FIG. 1, a computing environment places a plurality of computer system 102 and 106, (collectively referred to as computing devices) in communication with each other over a network 100 such as internet. The networked environment also includes a document reproduction device 104 capable of performing a print-job/copy-job function. Such a image reproduction system is intended to represent any xerographic system presently found in the arts. Each of the networked computing devices generally includes a mouse, keyboard, and a display such as a CRT, LCD, touchscreen display, or the like. Each of the computing devices also includes a processor capable of executing machine readable program instructions. The processor is in digital communication with a main memory for storing data which may include RAM, DRAM, and the like. The computing devices each further includes a hard drive and a removable storage unit capable of reading/writing to a storage media such as a floppy disk, magnetic tape, optical disk, CD-ROM, DVD, etc. Each of the computing devices further includes an internal network interface capable of sending information through a routing device (not shown) to internet 100. The computing device may include an Ethernet card or similar network interface card to connect to the Internet using, for example, a cable modem. Typical network interfaces include general purpose systems such as POTS (plain old telephone system) and integrated services digital network (ISDN) as well as special purpose systems such as a local area network (LAN) or wireless area network (WAN). Those of ordinary skill will readily appreciate that a networked computing environment capable of transmitting and receiving emails as described herein, can occur on a variety of networked environments other than the environment of FIG. 1.

Many aspects of the internet 100, illustrated as an amorphous cloud, are commonly known. As such, a detailed discussion as to the operation of the internet has been omitted. Suffice it to say, data packets are transmitted by a network of special purpose servers connected via a plurality of communication links. Data is transferred in the form of signals which may be, for example, electrical, electronic, electromagnetic, optical, or other signals. These signals are transmitted by wire, cable, fiber optic, phone line, cellular link, RF, satellite, or any other medium or communications link known in the arts. One computing device with access to the internet 100 communicates with another computing device with access to the internet 100 using well established communication protocols.

In the embodiment shown, computer system 106 also functions as a mail server for sending and receiving emails. Mail server software which enables a computer to function as a mail server is widely available in the arts. Email client software which enables a user to read, compose, display, manage emails and folders, set various user options and other settings is also available in the arts. Server 106 may function both as an email client and a mail server. It should be understood that any of the computers 102, including printing device 104, may also run email client or server software. Various features of the present email rating system are intended to be implemented on the mail server 106 and the email client running on any of computers 102 and printing device 104, depending on the system configuration environment and the desired implementation.

Operationally, the mail server generally includes an email system comprising a mail processor. In one embodiment, incoming email is received and one or more email filtering operations performed which identify unsolicited emails. Such filtering methods employ suitable filtering criteria such as sender name, keywords contained in the message, image files, active-X controls, and so forth. Incoming email may also be processed for virus checking and other special handling. Outgoing emails are configured by the processor for transmission over the internet by making outgoing emails substantially conform to protocols employed by network 100. Because of the diversity of mail server software on varying hardware, a further discussion as to a specific mail server program has been omitted. One mail server program comes bundled with the Apache Server Software available for free from the Apache Software Foundation.

In the networked environment of FIG. 1, computer system 106 also includes database 108 capable of storing and retrieving data records in response to a query. The database is also capable of adding new data records, updating stored records, and displaying stored data and other information made available by the database engine. Since database construction, query optimization, indexing methods, and record retrieval techniques and algorithms are well known in the arts, a further discussion as to a specific database implementation is omitted. One of ordinary skill would be able to obtain a database engine known in the arts and place the database in communication with any of the computing devices and the printing system. It should be fully appreciated that the database provided herewith for the storing and retrieval of information containing email rating scores of a plurality of senders can be associated with any of the networked devices illustrated in FIG. 1, as shown. The implementation of the database with computer 106 is but one configuration. Whichever networked device the database is associated with on internet 100, it should be understood that information can be sent to any device connected to network 100.

Figure 2:
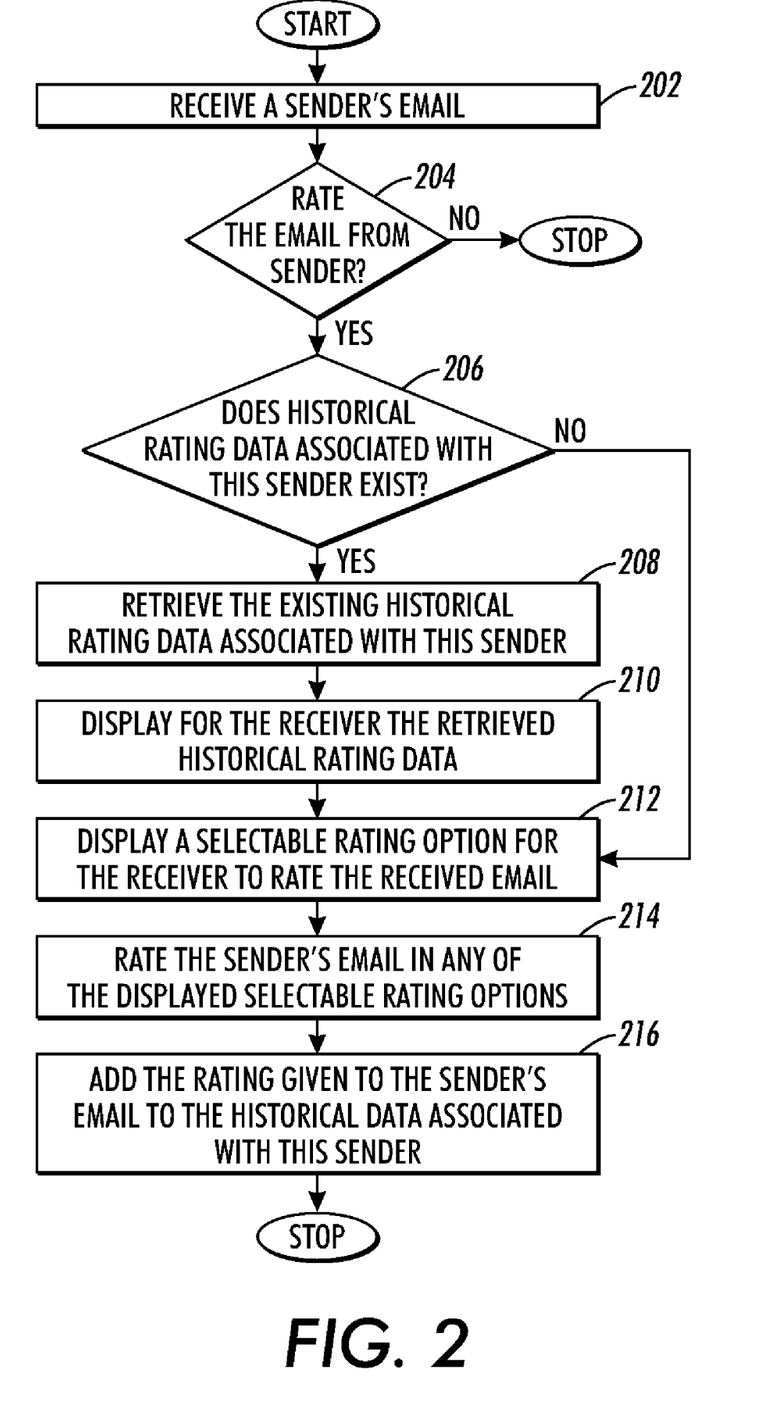
FIG. 2 illustrates a flow diagram of one embodiment of the present email rating method for enabling a user to rate an email from a sender based on selectable characteristics chosen from one of several categories.

Reference is now being made to FIG. 2 which illustrates a flow diagram of one embodiment of the present email rating method for enabling a user to rate an email from a sender based on selectable characteristics chosen from one of several categories. Various menu options are displayed either on the email itself or in a pop-up window for the receiver to view and select. Other features and enhancements are provided.

In one example embodiment, at step 202, a sender's email is received by an email receiver. The sender of the email is identified and at step 204, a determination made whether the sender is a person whose emails are intended to be rated by the receiver. Such a determination can be effectuated by information retrieved from the database which indicates the receiver's preferences as they relate to the sender. Information about how the receiver prefers to rate a sender can alternatively be stored locally on the receiver's computer. The receiver may have previously elected not to rate this sender. This may occur for instance wherein the sender is a spouse, for example, or a senior manager. The receiver may also have a variety of menu preferences when it comes to rating certain senders or certain emails of senders. The receiver may chose to only rate senders from a certain organization or from certain departments within an organization. Other default preferences, options, and settings may be stored in the centralized database or stored locally on the receiver's computer. Information regarding a particular sender may also be associated with various receiver contacts information.

If the sender is a person whom the email receiver intends to rate, at step 206, the database is queried for the existence of stored cumulative ratings and other information associated with the sender. If the data records exist then these are retrieved at step 208. The data is retrieved either in whole from a centralized database or in part from the receiver's local computer. Information stored about the email receiver's stored historical ratings given to this particular sender are additionally retrieved.

At step 210, the retrieved cumulative ratings scores and other stored information are displayed to the receiver when the email is opened. At step 212, selectable options are also displayed for the receiver. The options and historical data can be displayed when the email is opened for reading either on the sender's email itself or in a pop-up window associated with the opened email. At step 214, the receiver rates the sender's email in any of a plurality of categories such as, for example, usefulness, educational, motivational, helpfulness, productivity, and spelling/grammar. Rating categories can be tailored or otherwise customized by either the sender or the receiver. The receiver can elect not to rate an email in some or none of the available categories. After the receiver rates the email, the receiver accepts the ratings. At step 216, one or more of the ratings given by the receiver are added to the sender's cumulative email ratings and stored. If no ratings have yet been stored for this sender then a new record is created. At the receiver's option, the ratings given by the receiver are provided back to the sender. Alternatively, the receiver can elect not to have the sender receive the rating(s).

Depending on the networked computing environment and the objectives of the end-users hereof, various portions of the present email rating system can be implemented on the mail server. In one such embodiment, the mail server receives the sender's incoming email and queries the centralized database for stored ratings and other information associated with the sender and the receiver. Ratings and other information stored, if any, are retrieved from the database and sent to the receiver by the mail server along with the sender's incoming email. The receiver's email client receives the retrieved information and the incoming email. Ratings associated with the sender and receiver and other user selectable menu options are displayed for the receiver on either the email or in a pop-up window. A notification can alternatively be provided to the receiver indicating that an incoming email received has rating information associated with it. The receiver reviews the sender's overall cumulative rating and optionally a historical rating given by the receiver to this particular sender, if any. The receiver selects among a plurality of categories to rate the sender. Alternatively, the receiver elects not to rate this sender. At the receiver's option the rating is provided back to the sender. In another embodiment the sender receives the receiver's rating automatically.

Figure 3:
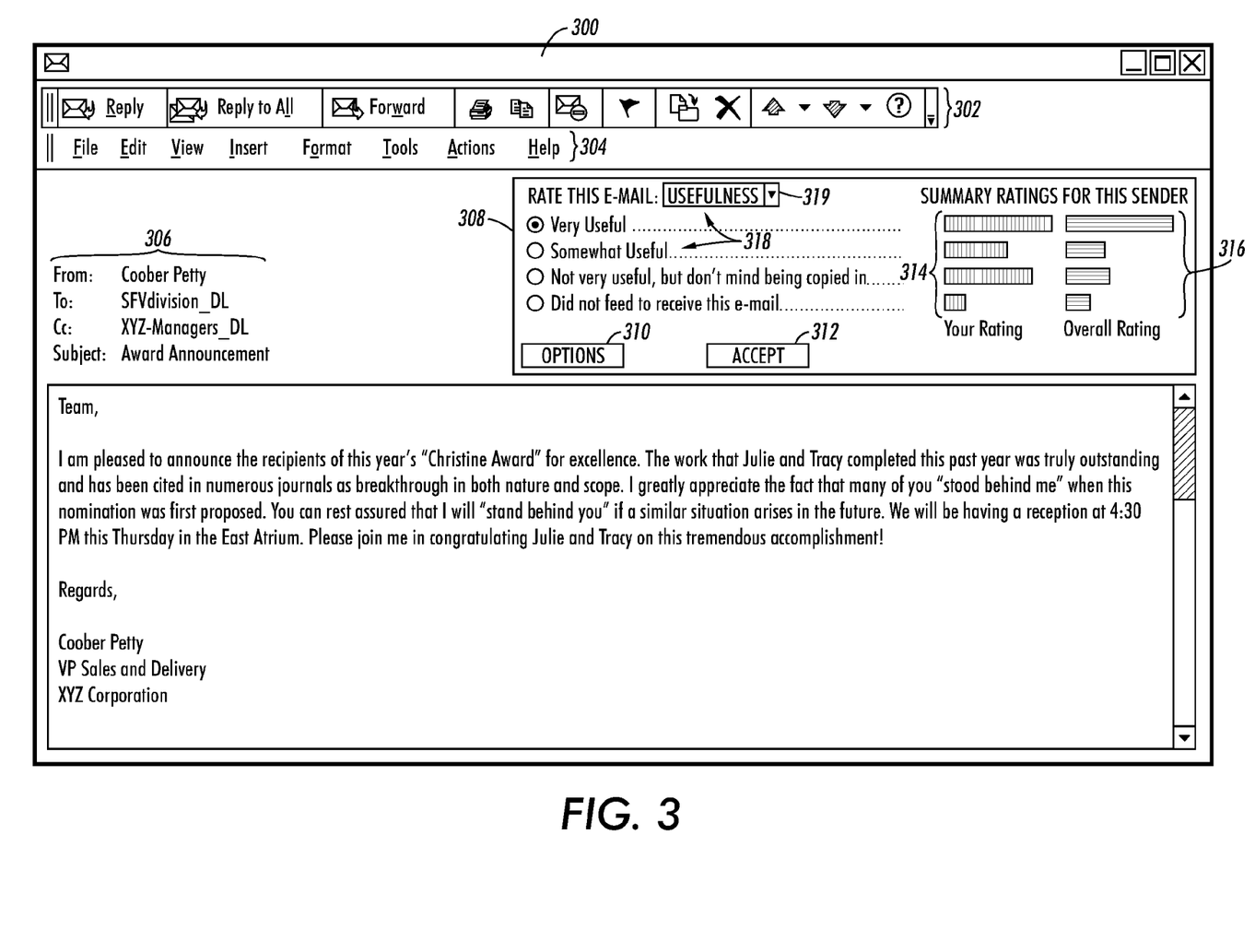
FIG. 3 illustrates one example of a received email with various features of the present email rating system applied thereto.

Reference is now being made to FIG. 3 which illustrates one example of a received email with various features of the present email rating system applied thereto. It should be understood that the window box wherein the rating system has been displayed can alternatively be displayed in a pop-up window when the user opens the email. Alternatively, the rating information and other selectable options can be effectuated by a pull-down menu of the email client itself. Such additional features and enhancements would require a modification to the standard menu options of the receiver's email software.

The email 300 of FIG. 3 is a standard email client product available from the Microsoft Corporation. The email client has a set of buttons 302 for enabling certain additional functionality along with a set of pull-down menus 304. One of ordinary skill will be familiar with one or more of the selectable options and other capabilities of such an email client. The email 300 has a header portion 306 which identifies the sender of the email and the receiver. Additionally, people who have been copied on the sender's email are also shown. Other header information such as IP addresses and routing servers and the like may also be included with the full header information associated with the email. The window 308 of the present email rating system is shown displayed on the email. The window may be made moveable by a mouse dragging operation or be resizable by a mouse right-click menu or in response to a mouse-over event.

The example embodiment of the email rating display window 308 includes a selectable options menu 310 as will be discussed herein further with respect to FIG. 4. The options menu effectively enables various user selectable features and enhancements to the present email rating system. When the options menu 308 is pressed by, for example, clicking a mouse button during a mouse-over event, additional options are made present to the user via a pop-up window or a pull-down menu readily programmable by one of ordinary skill using for example a C++ language in conjunction with standard menu programming tools available in the arts.

The display 308 of the present email rating system also includes an accept button 312. After the email receiver has accepted the ratings they have decided to give the sender's email, the receiver would then select the accept button 312. Upon acceptance, the ratings given by the receiver in any of the available rating categories would be sent to the historical database for accumulation with other ratings given that particular sender by other email receivers. The cumulative ratings would be added to one or more existing records in the database associated with the sender. If a record associated with the sender does not yet exist in the database then a new record would be created and stored. Additionally, information regarding the receiver and the rating categories used and other settings can also be stored in the networked historical database or locally on the receiver's computer. In an alternative embodiment, the receiver's preferences for their email rating system such as, for example, font size, window location, display options, preferred rating categories and the like, are also stored either in the database or locally on the receiver's computer. Information stored for a receiver's customized email rating display preferences can be additionally associated with a particular sender. In such a manner, a receiver's email rating system display can be customized based on the sender's identity or, for example, the sender's organization. Many variations are envisioned.

The display 308 of the present email rating system further includes a bar graph 314 showing historical data for the receiver's ratings in the category of Usefulness given to the sender. Bar graph 316 shows historical data for the ratings given to this particular sender by other receivers. It should be understood that each of the individual bars of graphs 314 and 316 are associated with the lines of text of the individual ratings 318 given in the category of Usefulness. Various bar graphs, charts, numbers, etc., are also displayable in lieu of the bar charts or in addition thereto.

Regarding the rating category, the embodiment of the display window 308 shows a selected email rating category 318 of Usefulness. This category would have been selected from a pull-down menu activated by a mouse-over event occurring on the area indicated by arrow 319. Pulling down the menu 319 would display other available rating categories and options as will be discussed herein further. In the embodiment shown, the Usefulness category has four options shown. These are Very Useful, Somewhat Useful, Not Very Useful, and Did not need to receive this email. Each of the receiver selectable options has a radio button associated with it. The receiver would select the rating they wish to give the sender's email in the category of Usefulness by clicking on the radio button associated with the desired rating. In the embodiment shown, email 300 was rated by the receiver SFVdivision_Mgr as Very Useful as indicated by the associated radio button having been selected. As can be seen from the historical bar graphs 314 and 316, the sender Coober Petty has received many Very Useful ratings from this receiver and has historically received many similar ratings from other email receivers who have received emails from sender Coober Petty.

It should be understood that the display 308 is only illustrative of one email rating system display. Other kinds of email rating display windows having varying features would also be displayable depending on the receiver's preference settings as they relate to the present email rating system. In the instance wherein the receiver has indicated that they do not intend to rate a particular sender or a particular type of email from a sender, or any emails from the sender, the email rating system display 308 would not appear.

Figure 4:
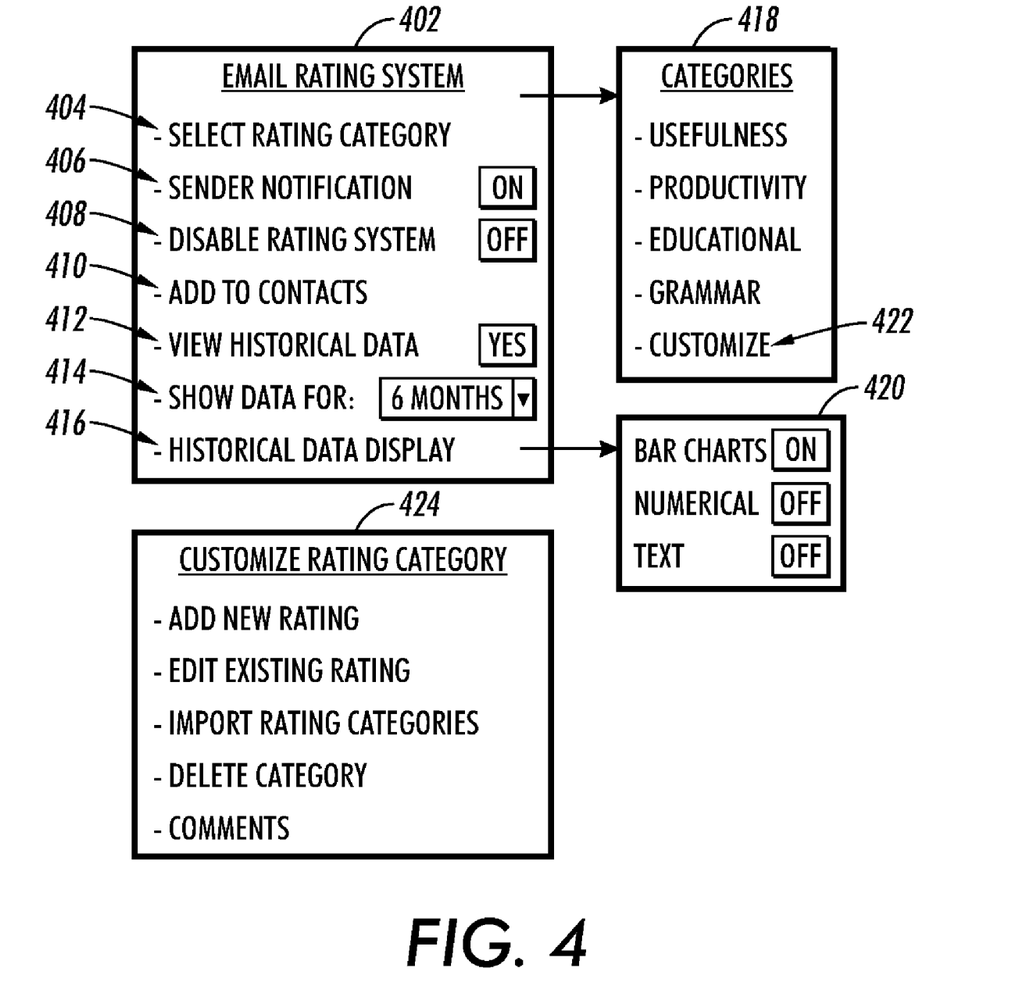
FIG. 4 illustrates one example embodiment of the various pull-down menu options available upon the receiver selecting the options 310 menu of FIG. 3 to customize their email rating display and set their preference settings.

Reference is now being made to FIG. 4 which illustrates one example embodiment of the various pull-down menu options available upon the receiver selecting the options 310 menu of FIG. 3 to customize their email rating display and set their preference settings. Various of the receiver's preference settings are intended to be stored locally and retrieved such that the display window is shown in a format preferred by the receiver with the default settings already set. Information regarding the sender or the sender's organization can also be associated with the receiver's email rating display window preference settings and stored locally either on the receiver's computer or in a data record in the centralized historical database. In such a manner, the receiver's email rating system display window appears already formatted in a manner preferred by the receiver whenever a particular sender's email is opened for reading. Optionally, the receiver can elect to not display the email rating system window for particular senders or particular kinds of emails.

The preference settings pull-down menu 402 provides numerous options for the receiver. The receiver can select a rating category 404. In the embodiment of FIG. 3, the rating category selected was Usefulness. If the receiver wishes to rate the sender to another rating category other than Usefulness, they would click on the rating category selection option 404 which would in turn bring up another menu listing the available categories by which a receiver can rate a particular email. In the embodiment shown, the available rating categories 418 are: Productivity rating category is selectable in the instance wherein the receiver desires to rate the sender's email based on productivity; Educational rating category is selectable in the instance wherein the receiver desires to rate the sender's email based on an educational value; and Grammar (and Spelling) rating category selectable in the instance wherein the receiver wishes to rate the email according to the a grammar and/or spelling criteria. Other rating categories such as Work Related, Informative, Performance, and the like, may additionally be provided.

The selectable Customize option 422 of the categories menu 418 brings up the additional Customize Rating Category 424 pull-down menu providing numerous options used by a receiver to customize the available ratings such as Add New Rating to enable a receiver to add a new rating and rating criteria, Edit Existing Rating to enable a receiver to edit or modify an existing rating or change the rating criteria to an existing rating category, Import Rating Categories to enable the receiver to upload rating categories created by other users or otherwise made available online, Delete Category to enable a user to erase or delete one or more rating categories or rating criteria, and Comments option for enabling the receiver to enter a comment field to the sender's email. Such a comment field would be either a text-based comment or alternatively a voice or video comment. Such comments would additionally be stored as part of the sender's rating record contained in the historical database, as will be discussed herein further with respect to FIG. 5.

The email rating options pull-down menu 402 further includes a Sender Notification 406 selectable menu option with a selectable ON/OFF button which enables the receiver to enable/disable the automatic sending of the receiver's rating back to the sender. The receiver can turn this or any other ON/OFF option by, for example, clicking a mouse button during a mouse-over event or via any of many other methods known in the arts for selecting an option from a programmable pull-down menu. This information, along with the other selectable menu options, would be stored along with the email rating system's user preference settings.

If the Sender Notification is ON, for example, then the rating given the sender's email would be automatically provided to the sender when the receiver selected the Accept button 312 of FIG. 3. In one embodiment, the sender would be provided with the receiver's email rating and other information via an automatic pre-formatted reply email which would be routed over the networked computing environment of FIG. 1 and over the internet back to the sender's email inbox. Such automatic email response software tools are widely available in the arts and are easily configurable to contain any information the sender deems necessary and appropriate. If the Sender Notification is turned OFF by the receiver then the sender does not receive an automated response containing the receiver's rating. The sender may receive an automated response that, for instance, their email had been rated by the receiver but the rating given has been omitted. Other variations of the kinds and types of responses are envisioned. For example, the receiver may wish to edit the automated response before it is sent to the sender upon completion of the receiver rating the sender's email. The receiver may wish to have their automated responses held in a delivery queue and sent to the sender at a given time, for instance, in the early morning hours when the mail server load may be at a minimum or after hours when the receiver has already left the office for the day. Such variations are features and enhancements to the present email rating system.

The email rating options menu 402 further includes a Disable Rating System 408 selectable menu option with a selectable ON/OFF button associated with the menu option. If the receiver disables the email rating system by turning this menu option OFF then the display window 308 does not get displayed when emails are received from this particular sender or the sender's organization. The receiver's email client would load the receiver's preferences associated with the sender of this particular incoming email and recognize that the display window is to be disabled for this sender. Thus, the email rating system would not be displayed and the sender's emails would not be rated. The receiver would turn this option ON to enable the email rating system for this particular sender again. In one embodiment, the email rating system is enabled/disabled by a programmable hot-key such as CTRL-E which would automatically reset this user preference to ON if it was in the OFF state. Additionally, any of the selectable menu options can be activated or de-activated by programmable hot-keys.

The email rating options menu 402 further includes an Add To Contacts 410 selectable menu option. By selecting this option, the receiver can add the sender to the receivers email contacts list. Additionally, the sender can be added to a contact list specific to the present email system such that preferences, ratings, and other information can be associated with the sender.

The email rating options menu 402 further includes a View Historical Data 412 selectable menu option associated with a selectable ON/OFF option to enable the display of the historical rating data. If, for example, the receiver has turned this option ON then the historical ratings appear in the display window 308. Such a display would be, for example, bar charts 314 and 316 of FIG. 3. If, on the other hand, the receiver's preference is to not view the historical rating data of this particular sender then they would turn this option OFF. In one embodiment, if the View Historical Data option has been disabled, no historical data is retrieved from the historical database. Alternatively, the historical data could be retrieved but simply not display. Depending on the receiver's preference to view historical rating data, this option can be turned ON/OFF.

The email rating options menu 402 further includes a Show Data For 6 Months 414 selectable menu option. This particular menu option has a pull-down which enables the receiver to select the number of months of historical rating data they wish to see displayed on the email rating display window 308. The selectable options may be selectable by weeks, months, years, and may additionally include an ALL option for displaying all the historical data for a rating category presently available for the particular receiver. In another embodiment, if the View Historical Data option 412 is disabled because the receiver does not wish to view any of the sender's historical data, then this option is grayed-out and thus not selectable by the receiver until such time as when the View Historical Data option has been enabled.

The embodiment of the email rating menu 402 includes a Historical Data Display 416 selectable menu option. Upon selection of this option by the email receiver, pull-down menu option 420 appears which enables the receiver to customize the display of the historical rating data available for this particular sender. In the embodiment shown, the available historical data display options are Bar Charts (as is shown in the display window 308 at 314 and 316), a Numerical option for enabling the display of historical data in numerical fashion such as, for example, in percentages, or in fractions, or in any of a plurality of other numeric relationships known in the arts, and a Text option for enabling the display of the historical data in a text format such as Sixty-Two, Forty-Nine, and the like, or in any of a number of text-based formats for display of historical data. Other options and variations to email rating menu 402 are envisioned. For example, in another embodiment, an option is provided wherein the ratings of past emails from a given sender are used to establish a set of rules which cause subsequent emails from this sender to be redirected to one of a plurality of folders or storage locations based on the ratings given by this particular email receiver. Rules used to redirect emails from one or a plurality of senders to one or more inboxes or email folders can be based on a rating of a sender's email in a particular category. One such rule may be, for instance, to redirect all emails from this sender to a "Deleted" folder with less than a 90% overall rating in the category of EducationaL Rules to redirect emails can also be based on the ratings in multiple categories. One such rule may be, for instance, to redirect all emails from any sender to a "Saved" folder which have an overall rating of less than 50%. Another rule may based on a rating given to a sender by a particular receiver. One such rule might be, for instance, to redirect all emails from this particular sender to a "Highly Rated" folder which have been given a 90% or higher overall rating from either TSMITH or BJONES (of FIG. 5) in any rating category or alternatively in one or more rating categories. Another such rule might be, for instance, to redirect any email which has ever received a 100% overall rating. Many variations and rules utilizing the many features and attributes of the present email rating system are possible.

It should be clearly understood that any of the menu options illustrated herein are by way of example only and should not be viewed as being limiting in any manner. Other menu options selectable by the user of the present email rating system and optionally stored as preference settings are possible and envisioned and thus should be considered to be encompassed by the scope of the appended claims.

Values, parameters, and variables associated with the many selectable menu options provided herein and with the various ratings, and rating categories and criteria are intended to be stored either in whole or in part in a centralized historical database accessible by any of the computing devices and printing systems of FIG. 1. The remainder are stored locally on the receiver's computer. The records are searchable by sender name and/or receiver name and/or any of the other data fields. One skilled in the art would readily appreciate that data structures used for creating a data record for storing such information either locally or in a database vary widely.

Figure 5:
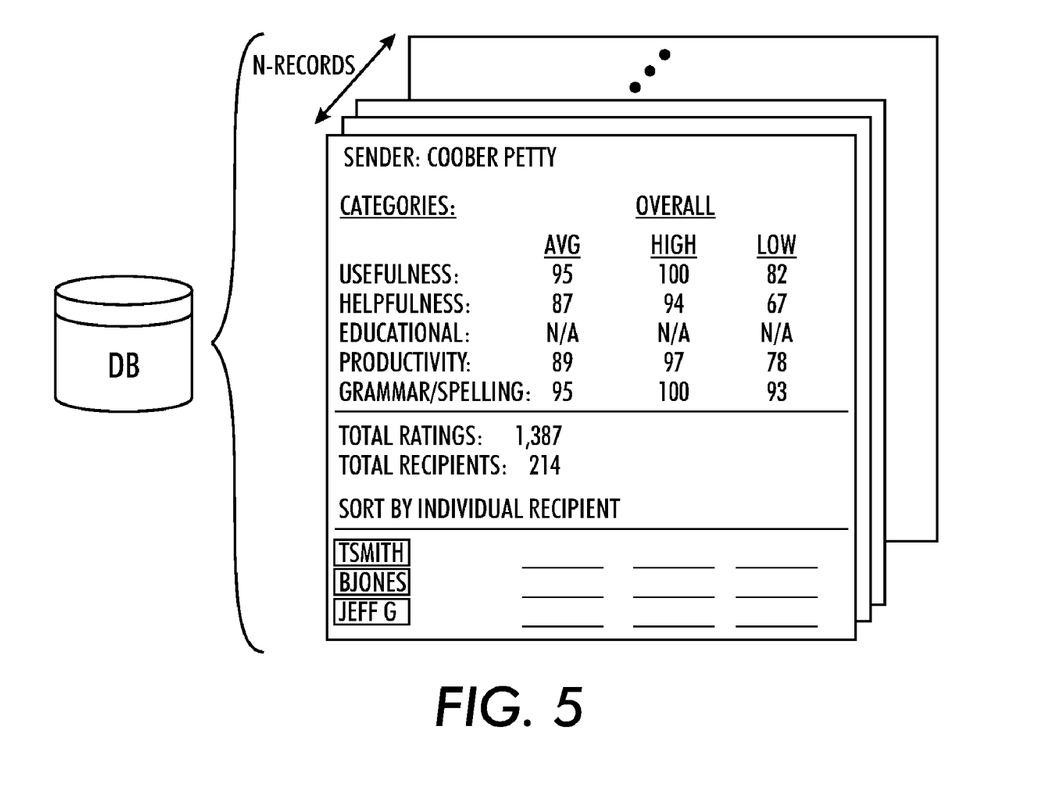
FIG. 5 illustrates one example embodiment of a plurality of records stored in the above-discussed historical database.

Reference is now being made to FIG. 5 which illustrates one example embodiment of a plurality of records stored in the above-discussed historical database. The embodiment of the particular data records shown contain a field for storing a sender name such as Coober Petty. The records also contain fields for storing cumulative rating data values in each of the available rating categories and for each of the rating criteria in each of the rating categories. Additionally, various computed ranges such as High/Low can be calculated and stored for each rating category. Other data fields include Total Ratings indicating the total number of reviews from which the various cumulated totals and percentages have been derived. In the example record shown, the total number of ratings is 1387. A Total Receivers field contains the total number of receivers which contributed to the total cumulative ratings. In the example data field shown, the number of receivers having rated sender Coober Petty is 214.

The embodiment of the record shown further contains a field for individual receiver ratings. For example, the data records additionally contain fields showing the individual email rating scores provided by any of the email receivers who rated Coober Petty using the present email rating system. Since space is limited in any figure provided herewith, it should be appreciated that each of the 214 individual email receivers who rated sender Coober Petty would have associated data fields containing each of their ratings along with any additional comments which any of the various receivers had provided. Other data fields containing additional information about the sender or receiver or their IP addresses or job titles, department or organization they belong to may also be stored. Such information may include the timestamp for when the email was sent and/or received and the time it was reviewed. Information contained in the mail header can also be retrieved and stored. Various parameters from the sender's or receiver's email client and their system configuration settings may also be stored.

Any of the information to be stored locally on the receiver's computer system, such as email system display preferences, can have a very similar data structure with many of the data fields overlapping with the data fields of the records stored in the historical database. It should also be understood that the records contained in the historical database accessible over the network include historical ratings from a wide variety of receivers given to a plurality of diverse email senders. Whereas, the information stored locally may additionally contain local settings directed to the receivers personal display or how the receiver intends to rate (or not rate) certain emails from certain senders. Although most or all of the information to be stored can be stored and accessed over the network from the database, this may not be the most resource efficient method of implementing the present email rating system. The receiver's computer is a better place for storing data such as the ratings that the receiver has previously given to each sender, along with the receivers display preferences. Maintaining the information locally on the receiver's computer provides for increased performance while decreasing network traffic. What data is stored locally on the receiver's computer, if any, will very likely depend on the system constraints of the computing environment of the end-user hereof. Whatever the implementation as to the allocation of data storage, speed and efficiency should be primary motivators.

Additional embodiments hereto include enabling a sender to request that a receiver rate or not rate a particular email. Such a request would be attached to the email and forwarded to the receiver. Additionally, the sender may request that the receiver rate the email according to a suggested rating category or criteria. The sender may include a desired rating criteria along with the email for use by the receiver to rate the email. The receiver may choose to ignore the sender's request or rate the sender's email according to another criteria. The receiver may optionally ignore or override such requests.

Additional enhancements include making email ratings stored on the centralized database viewable to the world by enabling users of the present email rating system. Such an enhancement hereto would be via a specialized software tool distributable over the internet and user installable on their local computer systems. Once installed, the specialized software tool provides menus and other various options which enables a user to review their own email ratings received and/or review ratings given to senders by various receivers. The software tool would enable the users to review, edit, add/delete, or otherwise interact with any of the information stored in the centralized historical database associated with the present email rating system. Enhancements to the specialized software tool would include providing users with the ability to notify or petition an email rating system administrator to make a correction to one or more records stored in the database of the present email rating system. Such a correction would be requested in, for example, the instance wherein a user of the present email rating system believes that they have been wrongly or perhaps maliciously rated by one or more receivers. Other corrections may be warranted in the instance wherein certain of the recorded information is incorrect and requires correction. The specialized software would also provide users with other features for viewing, correcting, and otherwise modifying any of the information stored in the database of the present email rating system.

Advantageously, the present email rating system and historical database enables receivers to manage emails from senders with overall low or poor email ratings. Senders with consistently low or poor email ratings would be handled or managed differently by receivers than would emails received from senders with high email rating scores. Emails received from senders with consistently low or poor email rating scores can be blocked, redirected, or managed appropriately.

Terms such as, computer program medium, computer executable medium, computer usable medium, computer readable medium, as used herein, refer to media such as main memory and secondary memory, removable storage devices, a hard disk installed in hard disk drive, and signals containing a data structure therein. These products are means for providing instructions and/or data to a computer system. The computer readable medium stores data, instructions, messages packets, or other machine readable instructions and information. Computer readable medium, for example, may include non-volatile memory, such as a floppy, ROM, flash memory, disk memory, CD-ROM, and other permanent storage useful, for example, for transporting information, such as data and computer instructions.

Furthermore, the computer readable medium may comprise computer readable information in a transitory state medium such as a network link and/or a network interface, including a wired network or a wireless network, which allows a computer to read such computer readable information. Computer programs may be stored in main memory and/or a secondary memory. Computer programs may also be received via a communications interface. Such computer programs when executed, enable a computer system to perform the features and capabilities provided herein.

It should be understood that the flow diagrams depicted herein are illustrative. Other operations, for example, may be added, modified, enhanced, condensed, integrated, or consolidated. Variations thereof are envisioned and are intended to fall within the scope of the appended claims. It should also be understood that the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions. Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. A computer usable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The article of manufacture may be included on at least one storage device readable by a machine architecture or other xerographic or image processing system embodying executable program instructions. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for an email receiver to rate an email sender, the method comprising:
   receiving an email from an email server, a person sending said email being an email sender, and a person receiving said email being an email receiver;
   retrieving, in advance of said receiver opening said email, information associated with said receiver which indicates whether said sender is a person whose emails are to be rated by said receiver; and
   in response to said sender being a person whose emails are to be rated:
      retrieving a local overall rating from storage;
      determining whether a cumulative email rating score for said sender exists and, in response to said cumulative email rating score existing, retrieving said cumulative email rating score;
      displaying said cumulative email rating score on any of: said email and a pop-up window associated with said opened email;
      displaying a plurality of selectable rating categories, wherein said selectable rating categories comprise any of: usefulness, educational, motivational, helpfulness, productivity, and spelling/grammar; and
      in response to said receiver electing to rate said email from said sender:
         said receiver rating said email by selecting one of said displayed rating categories; and
         in response to said email having been rated:
            adding said rating to said cumulative email rating score; and
            updating a historical database with said cumulative email rating score.

2. The method of claim 1, further comprising displaying said local overall rating on any of: said email and said pop-up window.

3. The method of claim 2, wherein in response to said email having been rated, further comprising:
   adding said rating to said local overall rating given to said sender by said receiver; and
   storing said local overall rating to a storage device.

4. The method of claim 1, further comprising said receiver selecting to send said email rating to said sender.

5. The method of claim 1, further comprising generating at least one rule to sort emails received from said sender based on said cumulative email rating score.

6. A system for an email receiver to rate an email sender, the system comprising:
   a database containing historical data regarding sender ratings, said database capable of retrieving said data in response to a query;
   a mail server in communication with said database;
   a processor in communication with said database and said mail server, said processor capable of executing a machine readable instruction for performing:
      receiving an email from an email server, a person sending said email being an email sender, and a person receiving said email being an email receiver;
      retrieving, in advance of said receiver opening said email, information associated with said receiver which indicates whether said sender is a person whose emails are to be rated by said receiver; and
      in response to said sender being a person whose emails are to be rated:
         retrieving a local overall rating from storage;
         determining whether a cumulative email rating score for said sender exists and, in response to said cumulative email rating score existing, retrieving said cumulative email rating score;
         displaying said cumulative email rating score on any of: said email and a pop-up window associated with said opened email;
         displaying a plurality of selectable rating categories, wherein said selectable rating categories comprise any of: usefulness, educational, motivational, helpfulness, productivity, and spelling/grammar; and
         in response to said receiver electing to rate said email from said sender:
            said receiver rating said email by selecting one of said displayed rating categories; and
            in response to said email having been rated:
               adding said rating to a said cumulative email rating score; and
               updating a historical database with said cumulative email rating score.

7. The system of claim 6, further comprising displaying said local overall rating on any of: said email and said pop-up window.

8. The system of claim 7, wherein in response to said email having been rated further comprising:
   adding said rating to said local overall rating given to said sender by said receiver; and
   storing said local overall rating to a storage device.

9. The system of claim 6, further comprising said receiver selecting to send said email rating to said sender.

10. The system of claim 6, further comprising generating at least one rule to sort emails received from said sender based on said cumulative email rating score.

11. A computer program product for an email receiver to rate an email sender, the computer program product comprising:
   a non-transitory computer-usable storage medium for storing instructions that when executed on a computer system causes the computer to perform a method comprising:
      receiving an email from an email server, a person sending said email being an email sender, and a person receiving said email being an email receiver;
      retrieving, in advance of said receiver opening said email, information associated with said receiver which indicates whether said sender is a person whose emails are to be rated by said receiver; and
      in response to said sender being a person whose emails are to be rated:
         retrieving a local overall rating from storage;
         determining whether a cumulative email rating score for said sender exists and, in response to said cumulative email rating score existing, retrieving said cumulative email rating score;
         displaying said cumulative email rating score on any of: said email and a pop-up window associated with said opened email;

displaying a plurality of selectable rating categories, wherein said selectable rating categories comprise any of: usefulness, educational, motivational, helpfulness, productivity, and spelling/grammar; and in response to said receiver electing to rate said email from said sender:

said receiver rating said email by selecting one of said displayed rating categories; and in response to said email having been rated:

adding said rating to a said cumulative email rating score; and updating a historical database with said cumulative email rating score.

12. The computer program product of claim 11, further comprising displaying said local overall rating on any of: said email and said pop-up window.

13. The computer program product of claim 12, wherein in response to said email having been rated further comprising:

adding said rating to said local overall rating given to said sender by said receiver; and storing said local overall rating to a storage device.

14. The computer program product of claim 11, further comprising generating at least one rule to sort emails received from said sender based on said cumulative email rating, score.

* * * * *